Feb. 18, 1969 P. R. BLACKMAN ETAL 3,428,778
ARCUATE CLUB TYPE WELDING GUN
Filed Dec. 31, 1964

INVENTORS
PAUL R. BLACKMAN
EDMUND T. SULLIVAN
BY
Edmund W Bepp
AGENT

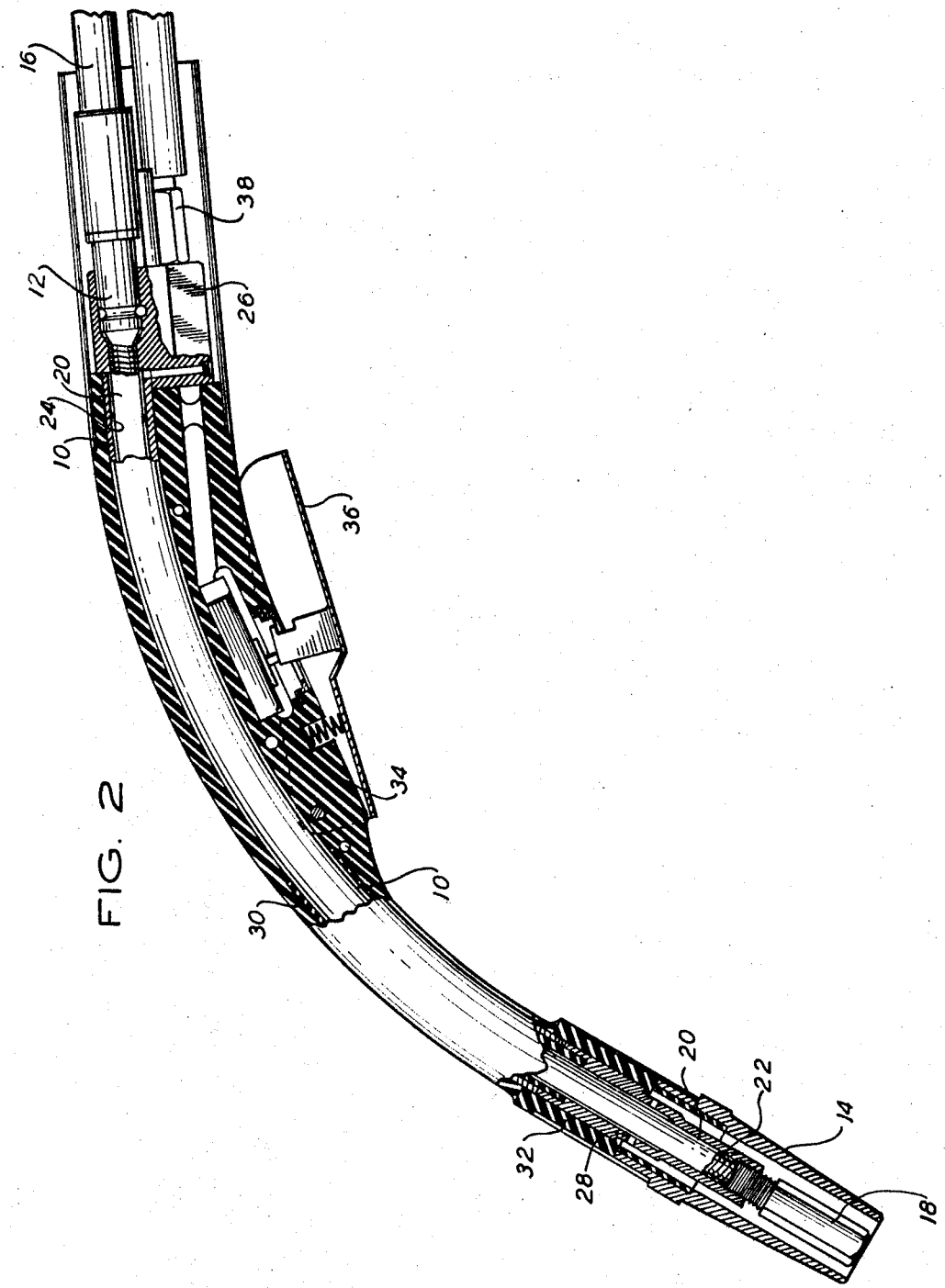

United States Patent Office 3,428,778
Patented Feb. 18, 1969

3,428,778
ARCUATE CLUB TYPE WELDING GUN
Paul R. Blackman, Cranford, and Edmund T. Sullivan, Jersey City, N.J., assignors to Air Reduction Company, Incorporated, New York, N.Y., a corporation of New York
Filed Dec. 31, 1964, Ser. No. 422,628
U.S. Cl. 219—130                                          1 Claim
Int. Cl. B23k 9/12; H05b 31/20

ABSTRACT OF THE DISCLOSURE

An improved welding gun of the arcuate club type which has a barrell of a fixed radius of curvature and forming means associated therewith to conform electrode wire received from a supply to said fixed radius of curvature so that feed of the wire through the gun is facilitated.

---

This invention relates to an improved welding gun for aiding in the process of wire feeding in an electric arc welding process wherein a consumable electrode is used. More particularly, this invention relates to a welding gun of the type mentioned which greatly reduces the internal friction which impedes the smooth flow of electrode wire.

In electric arc welding in which a wire of weld metal forms the welding electrode, the feeding of the wire at a desired rate has been a continuing problem. The welding wire is normally supplied in coils wound on spools which are generally of 12 inch diameter. The wire is fed from the reels through a flexible conduit to the welding gun which may be of the straight-through variety or the goose neck type, the latter offering much more opposition to wire flow due to a curved portion from whence it derives its name.

It is a primary object of this invention to produce a goose neck type welding gun which does not present the wire feed problem of the conventional gun.

It is a further object of this invention to provide a goose neck gun of a structure that offers a greatly reduced amount of internal friction associated with wire feeding.

Further advantages and objects of this invention will become apparent upon examination of the following descriptions and drawings, of which:

FIGURE 2 is a vertical section through an electric arc welding gun according to a preferred embodiment of the invention.

Wire feeding problems have been the source of trouble for some time, and many attempts have been made to improve the methods and apparatus used in wire feeding to remove the difficulties brought on by the friction between the wire and the elements forming its path from the storage reel to the welding arc. It is desirable to maintain the smooth even rate of wire feed since the wire is consumed at a constant rate; and if the wire feed speed increases, the arc may short out against the workpiece and a wire stoppage could result in a burnback which would damage the contact tube. Between these two possible occurrences, a varying of wire speeds will affect the arc length which will affect the weld characteristics resulting in a nonuniform weld. This problem has been especially serious in welding guns of the goose neck variety.

Figure 1:
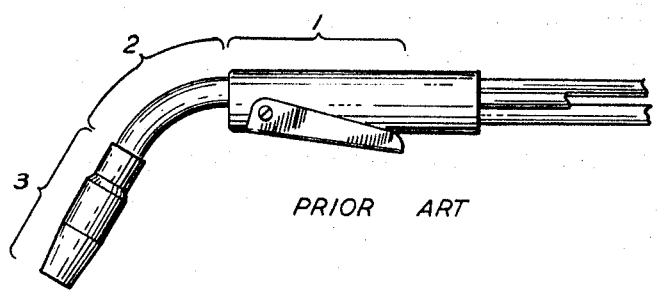
FIGURE 1 is an illustration of a prior art goose neck type welding gun.

The goose neck gun is one which has a bent portion between the point of wire entry and wire exit as opposed to the straight-through gun which has no curved paths for the wire to traverse. The goose neck gun is useful and desirable as it facilitates welding in some applications where it is difficult or even impossible to get a straight-through type gun into the work. FIGURE 1 illustrates the general configuration of a conventional goose neck gun with a straight portion 1 forming a handle at the back of the gun at the point of wire entry; a bent area 2; and a straight portion 3 between area 2 and the tip of the gun.

The problems such a configuration present to wire feeding are quite apparent when it is realized that the welding wire which must pass through the gun is a relatively stiff member with its own natural shape. Present American Welding Society standards dictate that the natural cast of welding wire be from 15 to 30 inches in diameter. This means that if a piece of wire were cut from a spool and dropped on a flat surface unrestricted by external forces it would form a circle having a diameter within the stated range, and in actual practice the vast majority of wire has a diameter in the lower portion of this range. As a wire is fed from a reel such as 4 in FIGURE 3, it travels through the flexible casing 5 on its way to the welding gun 6, but due to the flexible nature of the casing it alone offers very little resistance to the wire. When using a conventional goose neck gun, the wire at the point of entry into the gun must pass through a straight portion which is unnatural for the wire due to its natural cast and it resists the attempt to be straightened. At this point the problem is similar to that experienced in the straight-through guns, but the goose neck gun offers added resistance by then including a restricted curved portion as illustrated in FIGURE 1. This curved portion is a fairly sharp angle bend having a radius of curvature on the order of less than 5 inches. This means that a wire which has a natural cast which would at a minimum be 7.5 inches and possibly being as large at 15 inches is first passed through a straight section which tends to increase the radius and is then fed through a curved portion having a small radius. To compound the problem, the wire is then fed through an additional straight portion before being fed into the arc.

Figure 1A:
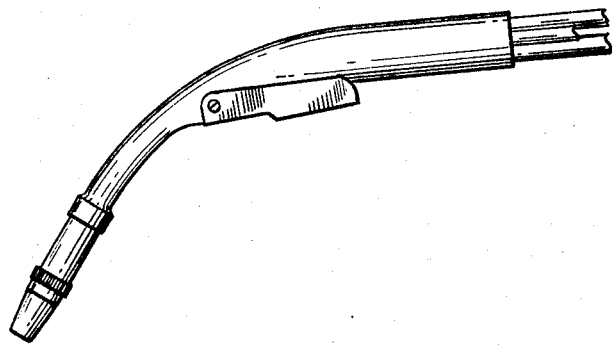
FIGURE 1a is an external configuration illustration of an electric arc welding gun according to the invention.

The combined resistive force of the just-mentioned areas presents a serious problem to the uniform feed of electrode wire into the arc in that not only is it necessary to have a large force to overcome the operation, it is also necessary to cope with the fact that this opposition is a constantly varying quantity. The present invention is designed to overcome these serious wire feed problems while preserving the advantages offered by the goose neck configuration. FIGURE 1a can be compared with the prior art gun to illustrate the new configuration's advantages.

A preferred embodiment of this invention as shown in FIGURE 2 comprises a barrel 10 having at the rear end thereof a coupling 12 and at the front end a nozzle 14. This coupling 12 is connected to a flexible casing 16 leading from the power driven feed rolls (not shown) which supply the welding wire. The barrel 10 contains a guide tube 20 which has a replaceable liner 22, preferably a spiral wound monocoil to reduce friction. The guide tube 20 is of a smaller diameter than the barrel 10 leaving an annular passage 24 to which shielding gas is supplied from inlet 26. The shielding gas passes through passage 24 to the area of a contact tube 18 in the nozzle where it passes through radial openings 28 to be expelled by the gas directing nozzle into the area of the weld. For welding operations where no shielding gas is necessary, these gas path features are not necessary.

Electric arc weld current is supplied from power supplies (not shown) to an inlet 38 and passes to the rear of the barrel 10 and guide tube 20 for communication with contact tube 18 where it is then passed to the electrode wire. Trigger 36 actuates a standard circuit of relays for controlling the welding current, wire feed motor drive, and other associated welding operations.

The gun is so constructed that the passageway for the welding wire forms a continuous curve of constant radius from the point of entry to the guide tube 10 at coupling 12 to the point of exit from the guide tube at the nozzle assembly.

The extent of the arcuate curvature of the barrel and its contents is such that there is an included angle between the radius lines to the two end points of substantially 60 degrees. This type of construction reduces the friction offered by the gun to the wire feed, with the most benefit being derived where the radius of curvature coincides with the natural cast of the wire. Where this is the case the wire will flow through the gun with a minimum of reshaping forces exerted on the wire impeding its flow.

Of course it is not possible to always have these two radii be the same, as the cast of the wire may fall within a fairly broad range and the gun is a rigid structure. It has been determined however that if the gun's curvature has a radius of approximately 8 inches, the resistance to the feed of wire is sufficiently low so that the above-described problems are greatly reduced so that they may be handled with other available safeguards.

This type gun is especially useful with wires of greater than $\frac{1}{16}$ inch diameter. The smaller wires are more flexible and are more easily forced around the sharp curvatures of the conventional guns; but this invention insofar as it covers the construction of a goose neck gun with a constant radius substantially throughout its length has application even with small wires.

Figure 3:
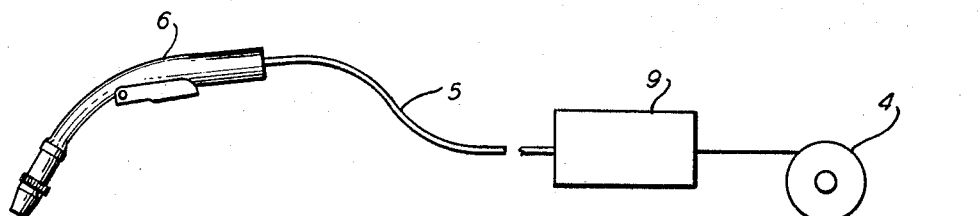
FIGURE 3 is an illustration of a wire feed system from the wire spool through the welding gun.

A further embodiment of the invention is illustrated in FIGURE 3 wherein a conventional wire feed system is illustrated with an added feature represented as radius former 9. This radius former is similar in operation to a wire straightener but instead of straightening the wire its function is to set the cast of the wire to coincide with the curvature of the particular gun being used. This feature is of advantage where the actual cast of the wire in use differs from the curvature of the gun and is of such a diameter that it resists the forming action of the gun. It is necessary that the radius former be power driven so as not to represent an additional load in the wire feeding path.

The foregoing descriptions are for the purpose of illustrating a single embodiment of the invention and it is not intended that the invention be limited except by the following claims.

We claim:

1. Metal arc welding apparatus for consumable electrode welding including a welding gun comprising a barrel being coupled at one end to a conduit through which the electrode wire is fed to said gun, and having at the other end a nozzle containing a wire contact tube, said barrel having a curvature of substantially constant radius from the conduit coupling to said nozzle, supply means of electrode wire, and forming means interposed between said supply means and said gun at the end of said conduit remote from said gun and conforming the electrode wire of said supply means to said barrel radius of curvature so that the feed through the welding gun is facilitated.

References Cited

UNITED STATES PATENTS

| | | | |
|---|---|---|---|
| 2,302,781 | 11/1942 | Force | 219—130 |
| 3,038,059 | 6/1962 | Hinrichs | 219—130 |
| 3,102,947 | 9/1963 | Blackman | 219—130 |
| 3,172,991 | 3/1965 | Arnoldy | 219—130 |

RICHARD M. WOOD, *Primary Examiner.*

J. GREGORY SMITH, *Assistant Examiner.*

U.S. Cl. X.R.

314—68